United States Patent [19]

Hunt

[11] Patent Number: 5,319,736
[45] Date of Patent: Jun. 7, 1994

[54] SYSTEM FOR SEPARATING SPEECH FROM BACKGROUND NOISE

[75] Inventor: Melvyn Hunt, Fareham, United Kingdom

[73] Assignee: National Research Council of Canada, Ottawa, Canada

[21] Appl. No.: 623,336

[22] Filed: Dec. 6, 1990

[30] Foreign Application Priority Data

Dec. 6, 1989 [GB] United Kingdom .................. 8927558

[51] Int. Cl.$^5$ ............................ G10L 7/06; G10L 9/18
[52] U.S. Cl. .................................... 395/2.36; 395/2.12
[58] Field of Search ..................... 381/41–49, 381/71, 94; 395/2, 2.36, 2.12

[56] References Cited

U.S. PATENT DOCUMENTS

| 4,625,083 | 11/1986 | Poikela | 381/46 |
| 4,677,676 | 6/1987 | Eriksson | 381/71 |
| 4,912,767 | 3/1990 | Chang | 381/47 |
| 4,932,063 | 6/1990 | Nakamura | 381/94 |
| 5,033,082 | 7/1991 | Eriksson et al. | 381/71 |
| 5,046,103 | 9/1991 | Warnaka et al. | 381/71 |

FOREIGN PATENT DOCUMENTS

| 0219712 | 4/1987 | European Pat. Off. | |
| 0332890 | 9/1989 | European Pat. Off. | G10L 3/00 |
| 4012349 | 10/1990 | Fed. Rep. of Germany | G10L 3/00 |
| 2239971 | 7/1991 | United Kingdom | G10L 5/00 |

OTHER PUBLICATIONS

Vemula et al., Technology Magazine, 1985–Aug./Sep., No. 1, New York, N.Y., pp. 23–30.
Widrow et al., "Comments on 'An Adaptive Recursive LMS Filter'", Proc. of the IEEE, vol. 65, No. 9, Sep. 1977, pp. 1402–1404.
Widrow et al., "Adaptive Noise Cancelling: Principles and Applications," Poc. of the IEEE, vol. 63, No. 12, Dec. 1975, pp. 1692–1716.
Boll, "Suppression of Acoustic Noise in Speech Using Spectral Subtraction," IEEE Trans. on ASSP, vol. ASSP-27, No. 2, Apr. 1979, pp. 113–120.
Amin et al, "A Generalized Noise Canceller Using Orthogonal Transformations," Proceedings of EUSIPCO-88, 4th European Signal Processing Conference, vol. 1, Sep. 5–8, 1988, pp. 419–422.
Hoy et al, "Noise Suppression Methods for Speech Applications," International Conference on Acoustics Speech and Signal Processing, vol. 3, Apr. 14, 1983, pp. 1133 and 1135.

Primary Examiner—David D. Knepper
Attorney, Agent, or Firm—Spencer, Frank & Schneider

[57] ABSTRACT

A digital signal processing system provides to sequences of power spectra in each of two signal channels, one channel, termed the "speech" channel, containing speech and environmental noise and the other channel, termed the "reference" channel, containing primarily the same environmental noise. An adaptive filtering technique is employed using the power spectra in both channels when speech is not present in the speech channel to obtain a relationship between the environmental noise power spectra in the two channels. When speech is present in the speech channel, a prediction of the environmental noise power spectrum on that channel is obtained from the power spectrum of the noise on the reference channel and the relationship between the noise power spectra on the two channels previously obtained. Thus the noise power spectrum be extracted from the power spectrum of the speech and noise in the speech channel. The result is that the speech will be more easily recognizable by either human listeners or speech recognition systems.

13 Claims, 4 Drawing Sheets

SYSTEM FOR SEPARATING SPEECH FROM BACKGROUND NOISE

BACKGROUND OF THE INVENTION

1. Field of the Invention

The invention relates to a method of processing speech mixed with noise that are concurrently detected by a microphone in a noisy environment. In many situations where communication with machines by voice using automatic speech recognition would be desirable, the application of speech recognition technology is unsuccessful because the background noise interferes with the operation of the speech recognition system. Examples of such situations are helicopters, airplanes, battle tanks, automobiles, factories, postal centers and baggage handling centers. This invention also has potential application to a class of devices known as "channel vocoders" which are used for human-to-human communications and which often need to operate in noisy conditions.

2. Description of the Prior Art

Almost all speech recognition systems carry out an acoustic analysis to derive (typically every 10 ms) a "frame" consisting of an estimate of the smoothed short-term power spectrum of the input signal. Such frames are almost always computed using either linear prediction or a bank of band-pass filters. The noise reduction technique described in this invention applies primarily to the latter kind of analysis.

One method of reducing the background noise added to a speech signal in a noisy environment is to use a noise-cancelling microphone. Such an approach, while a useful contribution, is often not enough in itself. It is complementary to the techniques described in this invention, and can be used freely in combination with them.

The remaining methods involve processing the signal, usually in digitized form. These methods can be classified by two criteria: whether they use a single or multiple microphones, and whether they operate on the acoustic waveform or on the short-term power spectrum. This classification results in four possible combinations, and all four have been tried.

Single-microphone waveform-based methods have been tried. They are effective at removing steady or slowly-changing tones, but they are much less effective at removing rapidly changing tones or atonal interference such as helicopter rotor noise.

Single-microphone spectrum-based methods have also been tried. They assume that the noise spectrum is stationary over periods when speech may be present. In one method, the noise spectrum is estimated over a period when there is no speech and then subtracted from the speech spectrum. In another method, the noise spectrum is used to identify frequency bands which will be ignored because they contain a noise level higher than the speech level in the incoming speech or in the particular frame of reference speech against which the incoming speech is being compared.

Multiple-microphone waveform-based methods have also been tried, and with two variations. In the first method, the microphones are used as a phased array to give enhanced response in the direction of the speaker. This, like the use of a noise-cancelling microphone, is an approach that can be combined with the invention described here.

In the second multiple-microphone waveform-based method, which is closely related to the present invention, one microphone (the "speech microphone") collects the speech plus the noise and the other (the "reference microphone") aims to collect only the noise. The noise waveform at the two microphones will, in general, be different, but it is assumed that an appropriate filter (one example being a finite-impulse-response ("FIR") filter) can be used to predict the noise waveform at the speech microphone from the noise waveform at the reference microphone. That is, $s_i$, the i'th sample of the noise waveform at the speech microphone is approximated by:

$$s_i = \sum_{j=0}^{L-1} w_j \cdot r_{i-j}$$

where $r_i$ is the i'th sample of the noise waveform at the reference microphone and $w_j$ is the j'th coefficient of the FIR filter of length L. Adaptive two-channel filtering methods can then be used to design the FIR filter, provided that its characteristics are changing only slowly. The method requires adaptively determining the values of the coefficients in the FIR filter that will minimize the mean-square error between the actual and predicted values of the noise waveform at the speech microphone; that is, the method requires minimizing $<e_i^2>$ where $$e_i = s_i - \hat{s}_i.$$

This second multiple-microphone waveform-based method works well with single sources of noise, such as a single loudspeaker, but has not been found to be effective with multiple, distributed time-varying noise sources of the kind occurring in aircraft and in many other noisy environments. As an example of the problem faced by this method, consider the situation where the waveform sampling rate is 10 kHz so that the separation in time between adjacent taps in the filter is 0.1 ms. In this time a sound wave in air travels about one-tenth of an inch, so that if the relative distance between the source of the two microphones changes by even that small distance the filter coefficients will be out by one position. If the filter was accurately cancelling a component in the noise at 5 kHz before the source moved, it will quadruple the interfering noise power at that frequency after the source moved one-tenth of an inch.

Two-microphone spectrum-based methods have also been tried, although not widely reported. If the relationship between the power spectrum at the speech microphone and the power spectrum at the reference microphone can be described by a single linear filter whose characteristics change only slowly, then the noise spectrum at the speech microphone can be predicted from the noise spectrum at the reference microphone as $$S_{ik} = a_k \cdot R_{ik}$$

where $S_{ik}$ and $R_{ik}$ represent the noise power in the i'th frame and the k'th frequency band for the speech and reference signals respectively. That predicted value of the noise power in the speech channel can be exploited as in the single-microphone spectrum-based method. The advantage of the two-microphone method is that the noise intensity and the shape of the noise spectrum can change during the speech. However, the relationship between the two noise spectra would be determined during a period when there is no speech and must remain constant during the speech.

The limitations of the present art can be summarized as follows. Single-microphone methods operating on either the waveform or the spectrum cannot deal effectively with rapidly time-varying noise. Multiple-microphone methods operating on the waveform cannot deal effectively with moving noise sources. Current dual microphone methods operating on the spectrum cannot deal effectively with multiple noise sources whose effect at the two microphones is different.

The present invention discloses a variation of the two-microphone method operating on the spectrum. It differs from previous methods in using an adaptive least-squares method to estimate the noise power spectrum in the signal from the speech microphone from a time-sequence of values of noise power spectrum in the signal from the reference microphone. Such adaptive least squares methods have previously been applied only to waveforms, not to power spectra.

Previous methods for estimating a noise power spectrum directly have either assumed it to be constant and taken an average from the speech microphone over a period when speech is absent, or have used single noise values from a reference microphone rather than taking linear combinations of sequences of such values.

SUMMARY OF THE INVENTION

By the present invention, there is provided an apparatus for separating speech from background noise comprising:

means to input speech contaminated with background noise to provide a noisy speech signal means to input primarily the background noise contaminating the speech to provide a reference signal signal processing means by which an estimate of the noise power spectrum contaminating the speech is obtained by an adaptive least-squares adaptation method from a plurality of recent samples of the power spectrum in the reference signal, and signal processing means by which said estimate of the noise power spectrum contaminating the speech is subtracted from the total power spectrum of said noisy speech signal to obtain an estimate of the power spectrum in the speech.

The present invention is directed to enhancing the recognition of speech which has been detected by a microphone (the "speech microphone") in a noisy environment. It involves a second microphone (the "reference microphone") which has been placed in the same noisy environment so that as little as possible of the desired speech is detected by that microphone. An adaptive least-squares method is used to estimate the noise power spectrum in the signal from the speech microphone from a time-sequence of recent values of noise power in the signal from the reference microphone.

The determination of the the estimate of the noise power spectrum in the signal from the speech microphone when speech is present is based on the relationship of the noise power spectrum at the two microphones when speech is not present at either microphone.

An adaptive algorithm, known as the Widrow-Hoff Least Mean Squares algorithm, is particularly appropriate for determining (during periods when no speech is present) the coefficients to be used in the linear combination of recent values of noise power in the signal in a particular band of the filter bank connected to the reference microphone. However, other known and still-undiscovered algorithms may be acceptable for this purpose.

When speech is present, the estimate of the noise power in each band of the noisy speech spectrum is subtracted from the power in the corresponding band of the noisy speech spectrum to leave as the output of the system an estimate of the speech power uncontaminated with noise.

BRIEF DESCRIPTION OF THE DRAWINGS

Various objects, features and advantages of the present invention will become apparent from a consideration of the following detailed description and from the accompanying drawings.

DETAILED DESCRIPTION OF PREFERRED EMBODIMENTS

Figure 1:
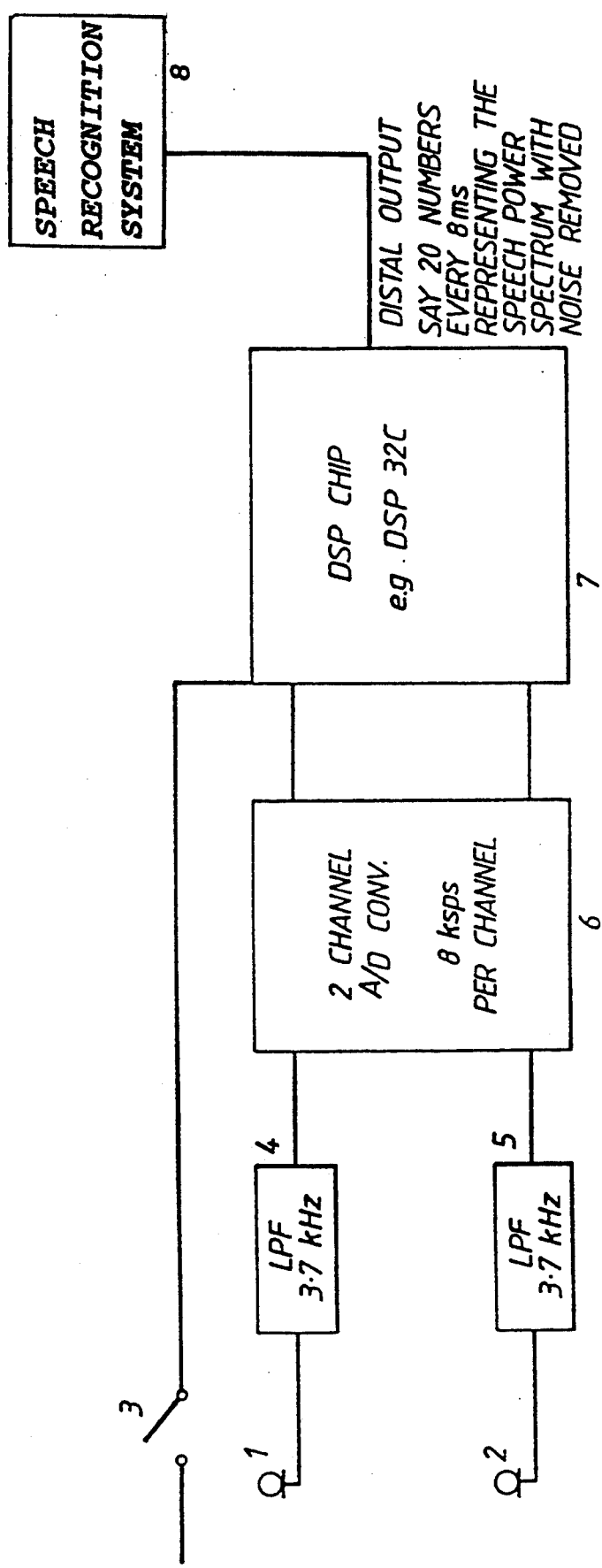
FIG. 1 illustrates the hardware which is used in this invention.

Referring to FIG. 1, the invention comprises two microphones 1, 2, a push-to-talk switch 3, two low-pass filters 4, 5, a two-channel analog-to-digital ("A/D") converter 6, and a digital signal processing ("DSP") chip 7. One of the microphones 1 is intended to pick up the speech which is contaminated with noise, and the other microphone 2 is intended to pick up only the noise. The path of the signal and the processing operations related to the signal from the speech microphone 1 will be called the "speech channel", and the path of the signal and the processing operations related to the signal from the reference microphone 2 will be called the "reference channel".

Although the noise at the two microphones is assumed to come from the same set of sources, its form will be different because, for example, the relative intensities of the various sources contributing to the noise will be different at the different locations of the two microphones.

In the speech channel, the signal out of the speech microphone 1 is first directed through a low-pass filter 4, and in the reference channel the signal out of the reference microphone 2 is first directed through a low-pass filter 5. The low-pass filters 4, 5 would be essentially identical. To prevent aliasing upon subsequent digitization, the low-pass filters 4, 5 would have a cut-off frequency of approximately 3.7 kHz.

The signals out of each low-pass filter 4, 5 are next subjected to A/D conversion. Conventionally and conveniently, the system would be provided with a single two-channel A/D converter 6 so that only one such device is required in the system, but alternatively there could be two distinct devices for A/D conversion. The A/D converter 6 would typically sample the two channels at a rate of 8 kHz. It would do this by having a 16 kHz sampling rate and taking samples alternately from the two inputs. The samples should be measured with a precision of 12 bits or better.

The two channels of output from the A/D converter 6, representing the digitized signals from the two microphones 1, 2, are then directed to the two inputs of the DSP chip 7. A suitable DSP chip is model AT&T DSP32C manufactured by American Telephone and Telegraph Company. That chip can be programmed in the high-level language called "C".

The push-to-talk switch 3 is connected to the DSP chip 7. In the case of the recommended DSP chip, this switch would simply be connected to ground when pressed to indicate that speech is present, but the nature of the signal given when the switch is pressed will depend on the requirements of the DSP chip used. The purpose of the switch 3 is to indicate that speech is present at the speech microphone 1 and that therefore the DSP chip 7 should suspend the calculating of the relationship between the noise at the speech microphone 1 and the noise at the reference microphone 2.

In an alternative embodiment of the invention, the switch 3 may be an automatic device which detects the presence of speech at the speech microphone, according to methods well known in the art.

The purpose of the switch 3 is simply to suspend the calculation of the relationship of the noise power at the two microphones when speech is present. Switch 3 is not necessarily used to indicate that the speech recognition system should receive that speech. If the user desires to utter speech that is not intended to be directed to the speech recognition system (called here "extraneous speech"), he must nevertheless press the switch 3 to suspend the calculations just mentioned. An automatic device which detects all speech, extraneous or not, is well suited to that function.

If the speech recognition system should not receive extraneous speech, it will be necessary to have an additional switch to indicate which speech is to be forwarded to the speech recognition system. Therefore, an alternative embodiment of the invention comprises two switches so that one switch (which could appropriately be an automatic device) is used to suspend the calculations of the noise power relationships and another switch is used to send the digitized speech to the speech recognition system which follows after the present invention.

If there is only a simple press-to-talk switch 3 (whether automatic or not) as illustrated in FIG. 1, so that all output of the invention is directed to the speech recognition system, and the user desires to utter extraneous speech, he should wait a short time (at least a few seconds, but the longer the better) after the extraneous speech before uttering speech that is intended to be recognized by the speech recognition system.

The output of the DSP chip 7 will be a digitized representation of the power spectrum of the speech with the noise essentially removed, typically represented by 20 numbers every 8 ms. This output could then be passed to a speech recognition system 8 of a type, well known in the art, which operates on the power spectrum of the speech to be recognized.

Figure 2:
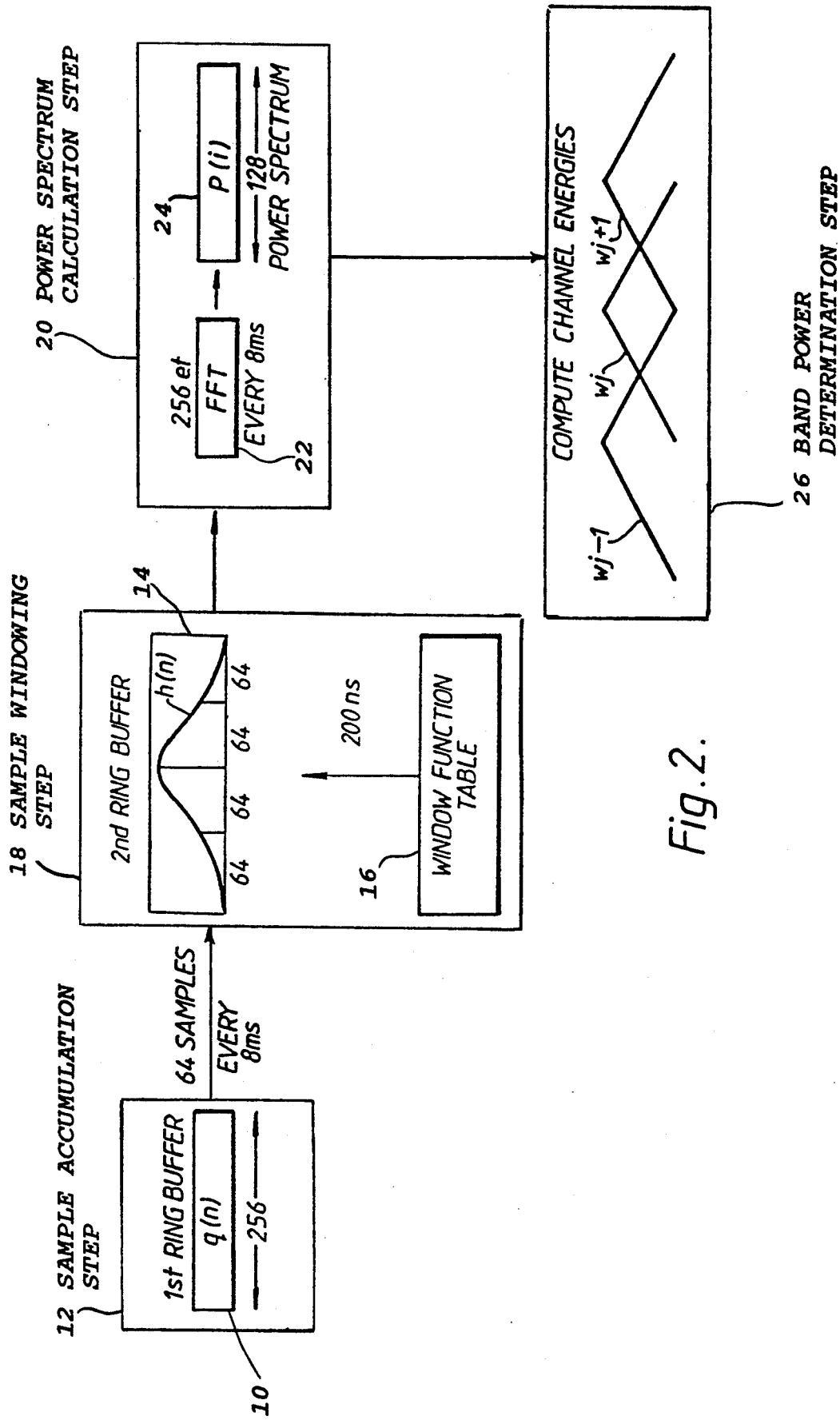
FIG. 2 illustrates the processing of the signal in each of the two channels in the DSP chip 7.

FIG. 2 illustrates the processes in the DSP chip 7 with respect to only one of the channels. Identical processes are carried out for both channels. If the channels have been combined by multiplexing at the output of the A/D converter, as is common and appropriate for the preferred DSP chip identified above, the first operation in the DSP chip 7 will be de-multiplexing of the signals.

The incoming signal is written to a first ring buffer 10 containing 256 elements during a sample accumulation step 12. Every 8 ms, during which 64 samples will have accumulated, the contents of the first ring buffer 10 are copied to another 256-element ring buffer 14 and there multiplied by a Hanning (raised-cosine) window function stored in a 256-element table 16. This is accomplished in a sample windowing step 18. If the n'th element of the first ring buffer 10 is q(n), and the n'th element in the table 16 containing the raised-cosine window function is h(n), the corresponding element in the buffer 14 containing the windowed signal is t(n) where $$t(n) = q(n) \cdot h(n).$$

Nest is a power spectrum calculation step 20. During an initial sub-step 22, a fast Fourier transform is applied to the 256 values in the second ring buffer 14. Writing the i'th real and imaginary elements of the resulting 128-element complex spectrum as $x_k(i)$ and $y_k(i)$ respectively, where k denotes the k'th block of 64 samples to be transferred, the power spectrum can be computed as $p_k(i)$ during a sub-step 24, where $$p_k(i) = x_k(i) \cdot x_k(i) + y_k(i) \cdot y_k(i).$$

The 128-element power spectrum must then be grouped into a set of, say, 20 frequency bands during a band power determination step 26. The subscript j will be used to identify these 20 bands. Typically, these bands would be spaced to reflect the frequency resolution of the human ear, such as by having the center frequencies equally spaced up to 1 kHz and then logarithmically spaced up to the highest band. The power in the j'th band for the k'th block of 64 samples would be computed as $$b_j(k) = \sum_{i=0}^{127} w_j(i) \cdot p(i)$$

where $w_j(i)$ is the value of a window function forming the j'th band and corresponding to the i'th element of the power spectrum. The values of $w_j(i)$ will be stored in a table in the DSP chip 7. Typically, the window function $w_j(i)$ has the form of a triangle with its apex at the centre frequency of the j'th frequency band and its base spanning the range from the center of frequency band $j-1$ to the centre of frequency band $j+1$, so that the value of $w_j(i)$ is zero outside the range of frequencies covered by the base of that triangle.

The identical processes illustrated in FIG. 2 are carried out for both the speech and reference channels. The power value $b_j(k)$ mentioned above can be considered to be the power in the speech channel; another value, which might be denoted $a_j(k)$ will be calculated to represent the power in the reference channel. However, to now simplify the notation, the subscript j (which indicates that the value pertains to the j'th frequency band) will be dropped because the following operations are carried out separately for all the frequency bands (typically, 20 bands). Therefore, the power in the reference channel is denoted a(k) and the power in the speech channel is denoted b(k) for the k'th block of samples.

The power in the speech channel, b(k), consists of both speech power and noise power, which can be considered to be additive and which will be denoted by the symbols s(k) and c(k) respectively. That is, $$b(k) = c(k) + s(k).$$

Figure 3:
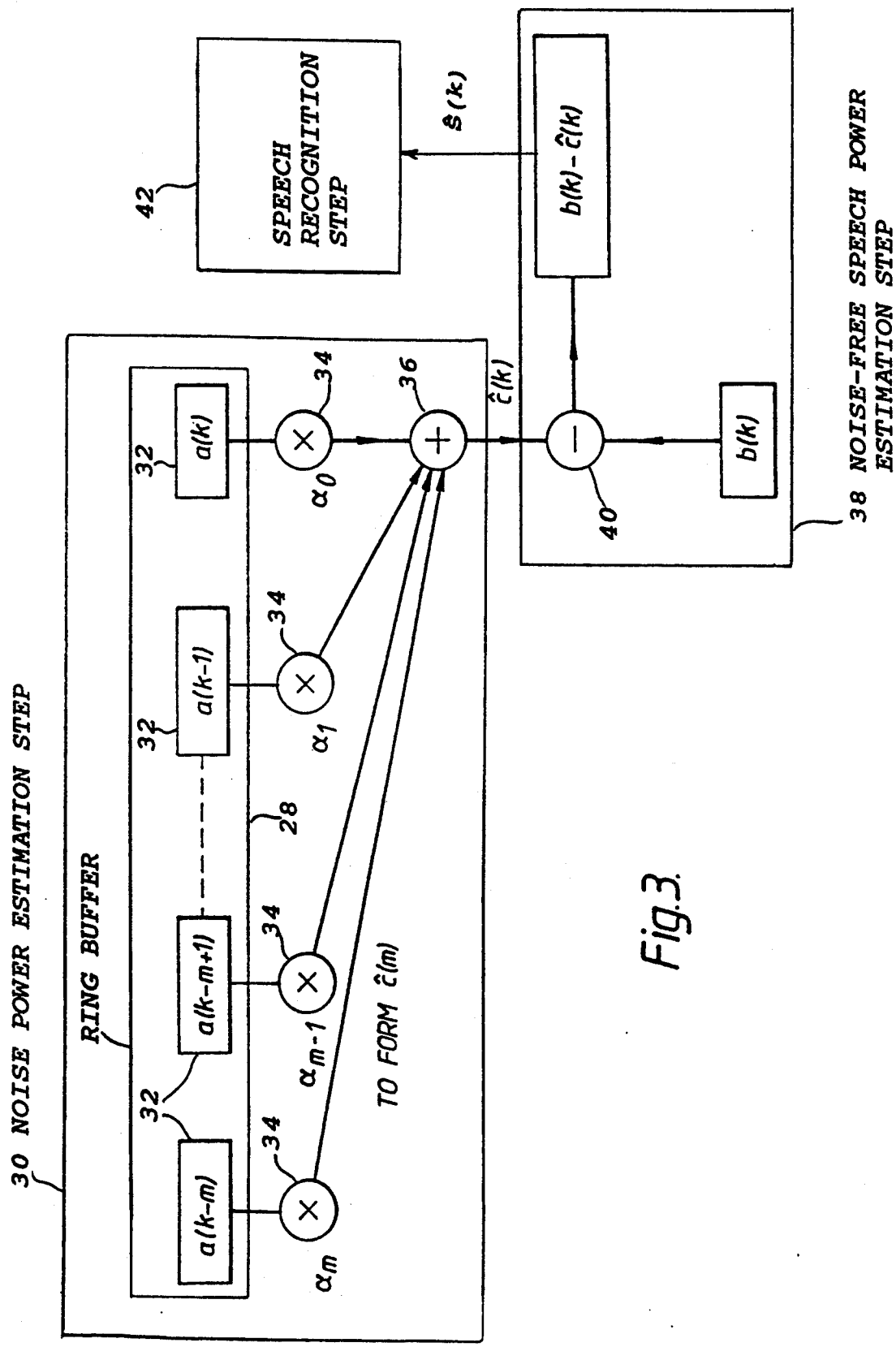
FIG. 3 illustrates further processing applied to the reference signal in the DSP chip 7, by which recent values of the power in the reference signal are linearly combined and subtracted from the noisy speech signal to obtain the output of the apparatus.

Referring now to FIG. 3, the values of the noise power in the reference channel are retained in a ring buffer 28 during a noise power estimation step 30. The buffer 28 is capable of holding the latest M values of a(k). A typical value for M, the number of elements in the ring buffer, is 20. Four of these elements are illustrated, and are marked by reference number 32. The values of the noise power in ring buffer 28 are combined linearly (during multiplication sub-steps 34 and a summing sub-step 36) to produce an estimate, c(k), of the noise power in the speech channel. In other words, the latest M values of noise in the reference channel are reasonably able to predict the current noise in the speech channel. This can be expressed as $$c(k) = \sum_{m=0}^{M-1} a_m \cdot a(k-m)$$

The estimate c(k) can then be subtracted from b(k) to form an estimate of the noise-free speech power s(k) during a noise-free speech power estimation step 38. That is:

$$s(k) = b(k) - c(k).$$

In FIG. 3 this subtraction is indicated by a sub-step 40. Step 38 is followed by a speech recognition step 42. This is accomplished by speech recognition system 8 (see FIG. 1).

Figure 4:
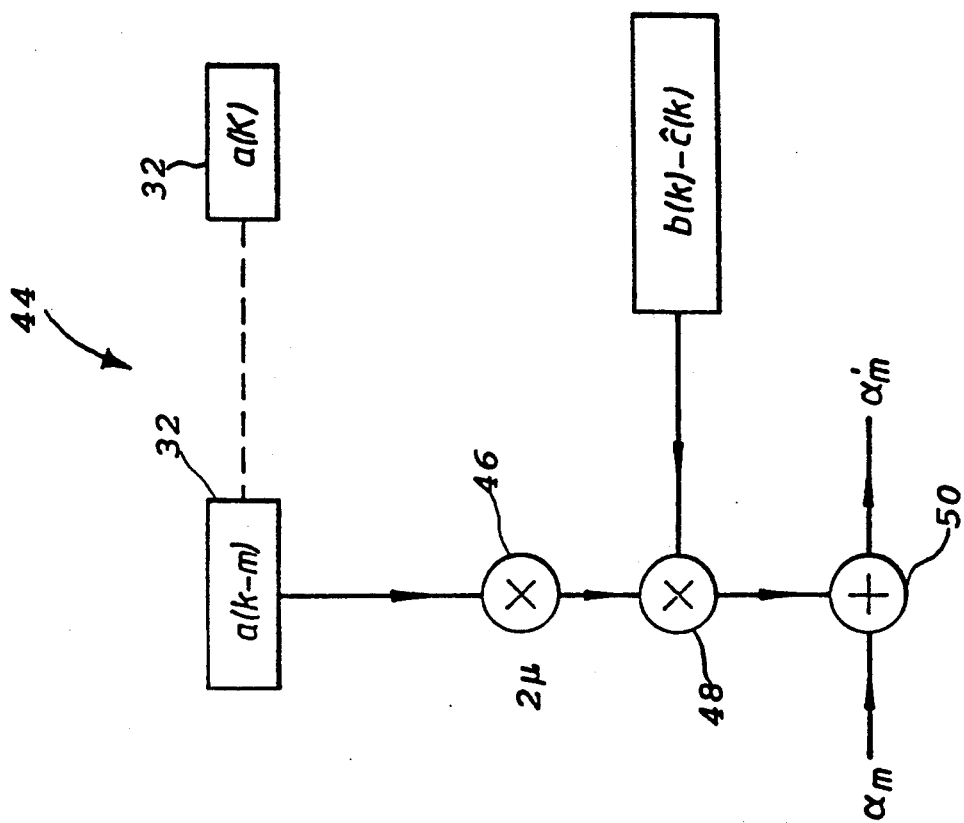
FIG. 4 illustrates the processes in the DSP chip 7 for determining the coefficients for the linear combination of recent values of the power in the reference signal.

Referring now to FIG. 4, which illustrates a coefficient updating step 44, the coefficients $a_m$ are updated only during periods when no speech is present (as indicated by the switch 3). An adaptive algorithm, known as the Widrow-Hoff Least Mean Squares algorithm, is used to update the coefficients $a_m$ every time a new value of k occurs (typically, every 8 ms). This algorithm is the following:

$$a_m' = a_m + 2\mu[b(k) - c(k)] \cdot a(k-m)$$

where $a_m$ is the m'th coefficient before updating and $a_m'$ is the corresponding value after updating. The reference channel power values are multiplied by twice a constant $\mu$ in a sub-step 46, and the products are multiplied by $b(k) - c(k)$ during a sub-step 48. The results are added to the current coefficients in a summing sub-step 50. The initial values of the coefficients $a_m$ can be set to zero.

The constant $\mu$ controls the rate of adaptation, a large value giving faster adaptation but less-accurate final values of the coefficients in the case when conditions are stable. The choice of a value of $\mu$ therefore should depend on how quickly the noises are changing. Different bands, of which there are typically 20 denoted by the subscript j, can have different values of $\mu$, and in general the values of $\mu$ should be related to the standard deviation of the energy values in the speech channel over time.

It is possible for inappropriate values of the coefficient $a_m$ to lead to the illogical result c(k)<0. In that event, c(k) should be set equal to zero. It is also possible that some calculations lead to c(k)>b(k). In that event, c(k) should be set equal to b(k).

The input to speech recognition system 8 is a set of values of s(k) for all frequency bands (typically 20 bands). Previously in this specification, the bands were represented by the subscript j, so the output might also be appropriately be represented as $s_j(k)$. This constitutes an estimate of the noise-free speech power and is well suited to be the input to a speech recognition system that accepts power values as inputs.

The output $s_j(k)$ could also be used as the input to a channel vocoder, which is a device for transmitting speech in a digitized form.

The benefit provided by this invention of extracting the background noise will be useful in many types of device intended to either transmit or recognize speech.

Thus, the present invention is well adapted to carry out the objects and attain the ends and advantages mentioned, as well as those inherent therein. While presently preferred embodiments of this invention have been described for purposes of this disclosure, numerous changes in the arrangement of parts, configuration of the internal software, and choice of algorithms will suggest themselves to those skilled in the art. Those changes are encompassed within the spirit of this invention and the scope of the appended claims.

I claim:

1. An apparatus for separating speech from background noise, comprising: means for inputting speech contaminated with background noise to provide a noisy speech signal; means for inputting primarily the background noise contaminating the speech to provide a reference signal; signal processing means for implementing an adaptive least-squares adaptation method to obtain an estimate of the power spectrum of the noise contaminating the speech from a plurality of recent samples of the power spectrum of the reference signal, and for subtracting said estimate of the power spectrum of the noise contaminating speech from the total power spectrum of said noisy speech signal to obtain an estimate of the power spectrum of the speech.

2. An apparatus as claimed in claim 1, in combination with a speech recognition system which receives the estimate of the power spectrum of the speech.

3. An apparatus as claimed in claim 2, wherein said signal processing means comprises means for using the Widrow-Hoff Least Mean Squares algorithm to implement said adaptive least-squares adaptation method.

4. An apparatus as claimed in claim 1, wherein said signal processing means comprises means for using the Widrow-Hoff Least Mean Squares algorithm to implement said adaptive least-squares adaptation method.

5. An apparatus as claimed in claim 1, wherein said signal processing means comprises means for combining said samples linearly using previously derived coefficients in a combining formula to implement said adaptive least-squares adaptation method, said coefficients having been deriving during recent periods when no speech was present in said noisy speech signal.

6. An apparatus as claimed in claim 5, in combination with a speech recognition system which receives the estimate of the power spectrum of the speech.

7. An apparatus as claimed in claim 5, wherein said means for combining comprises means for using the Widrow-Hoff Least Mean Squares algorithm.

8. A method of separating background noise from a noisy speech signal, comprising: continually monitoring background noise to provide a reference signal; processing the reference signal to obtain an estimate of the power spectrum thereof using an adaptive least-squares adaptation method from a plurality of recent samples of the power spectrum of the reference signal; and processing the noisy speech signal by subtracting the estimate from the total power spectrum of the noisy signal to obtain an estimate of the power spectrum of the speech.

9. A method as claimed in claim 8, wherein said adaptive least-squares adaptation method uses the Widrow-Hoff Least Mean Squares algorithm.

10. A method as claimed in claim 8, wherein said adaptive least-squares adaptation method combines said samples linearly using coefficients in a combining formula that were previously derived during recent periods when no speech was present in said noisy speech signal.

11. A method as claimed in claim 10, wherein said adaptive least-squares adaptation method uses the Widrow-Hoff Least Mean Squares algorithm.

12. A method as claimed in claim 11, in combination with the step of conveying said estimate of the power spectrum of the speech to a speech recognition system.

13. A method as claimed in claim 8, in combination with the step of conveying said estimate of the power spectrum of the speech to a speech recognition system.

* * * * *